United States Patent
Roberts

(10) Patent No.: US 9,819,502 B2
(45) Date of Patent: Nov. 14, 2017

(54) SHUT OFF MECHANISM FOR ALL INTERNET TRAFFIC

(71) Applicant: STRONG BEAR LLC, Belfast, ME (US)

(72) Inventor: Rodney B. Roberts, Belfast, ME (US)

(73) Assignee: STRONG BEAR LLC, Belfast, ME (US)

(*) Notice: Subject to any disclaimer, the term of this patent is extended or adjusted under 35 U.S.C. 154(b) by 23 days.

(21) Appl. No.: 14/875,842

(22) Filed: Oct. 6, 2015

(65) Prior Publication Data

US 2016/0099943 A1    Apr. 7, 2016

Related U.S. Application Data

(60) Provisional application No. 62/060,638, filed on Oct. 7, 2014.

(51) Int. Cl.
| | | |
|---|---|---|
| *H04L 29/06* | (2006.01) | |
| *H04L 12/12* | (2006.01) | |
| *H04W 12/08* | (2009.01) | |

(52) U.S. Cl.
CPC ............ *H04L 12/12* (2013.01); *H04L 63/108* (2013.01); *H04W 12/08* (2013.01)

(58) Field of Classification Search
CPC ....... H04L 12/12; H04L 63/108; H04W 12/08
USPC .................................................. 716/1, 2, 3, 7
See application file for complete search history.

(56) References Cited

U.S. PATENT DOCUMENTS

| | | | | |
|---|---|---|---|---|
| 9,038,187 | B2* | 5/2015 | McHugh ................ | G06Q 10/10 |
| | | | | 705/306 |
| 9,553,816 | B2* | 1/2017 | Luna ....................... | H04L 47/25 |
| 2002/0099828 | A1 | 7/2002 | Darby | |
| 2003/0143879 | A1 | 7/2003 | Hunter | |
| 2007/0038632 | A1* | 2/2007 | Engstrom ............... | G06F 21/62 |
| 2007/0074284 | A1 | 3/2007 | Woog | |

(Continued)

OTHER PUBLICATIONS

Time based personalization for the moving user, Panayiotou et al, 10.1109/ICMB.2005.106 IEEE, 2005.*

(Continued)

*Primary Examiner* — Jahangir Kabir
(74) *Attorney, Agent, or Firm* — Marsh Fischmann & Breyfogle LLP; Kent A. Lembke

(57) ABSTRACT

A client device providing enhanced network traffic security. The client device includes a processor and a network connection element selectively operable to provide two-way data traffic between the client device and a digital communications network such as the Internet. The client device includes a memory device managed by and accessible to the processor, and the memory device stores a network traffic schedule, which may be defined by a device operator through a shut-down mechanism user interface. The client device includes a shut-down mechanism causing the network connection element to provide the two-way data traffic between the client device and the network according to the network traffic schedule, which defines first and second time periods. The shut-down mechanism allows the network connection element to connect to the network during the first time period and prevents the network connection element to connect during the second time period.

14 Claims, 4 Drawing Sheets

(56) References Cited

U.S. PATENT DOCUMENTS

| | | | |
|---|---|---|---|
| 2013/0052990 A1* | 2/2013 | Zhang | H04L 63/20 455/411 |
| 2014/0129406 A1* | 5/2014 | White | G06Q 40/04 705/37 |
| 2015/0230152 A1* | 8/2015 | Raleigh | H04L 41/0893 370/230 |

OTHER PUBLICATIONS

Energy Efficient Home Gateway Based on User Service Traffic in Always-On Home Network Environment, Park et al, 10.1109/ENICS.2008.34, IEEE, 2008.*

* cited by examiner

SHUT OFF MECHANISM FOR ALL INTERNET TRAFFIC

CROSS-REFERENCE TO RELATED APPLICATIONS

This application claims the benefit of U.S. Provisional Application No. 62/060,638, filed Oct. 7, 2014, which is incorporated herein by reference in its entirety.

BACKGROUND

1. Field of the Description

This description is generally directed toward systems and methods toward providing Internet security, and, more particularly, the description teaches systems and methods for enhancing security for a client device (i.e., a computer or nearly any other electronic device (such as a smartphone, a laptop or other portable computing device such as a computer tablet or device used to access audiobooks and to stream video) that is configured for network connectivity and capable of running the software described herein) when the client device is used by operators to access a computer network (i.e., any digital communications network with the Internet being the main (but non-limiting) example discussed herein).

2. Relevant Background

In today's society, nearly everyone utilizes devices (e.g., "client devices") to access a digital communications network such as the Internet for personal and business purposes. For example, a person may access the Internet at home and while away from home with a smart phone, computing tablet, a laptop, a notebook or the like, and this access may be via a wired connection (e.g., a local area network (LAN) cable) or a wireless connection (e.g., the client device may be configured for a WiFi connectivity with a network router or similar device). In another example, a worker may arrive at their office and use their desktop or other computer to log onto the Internet to perform work-related or personal tasks throughout their workday. Use of the Internet and other communications networks is so integrated into nearly everyone's daily life that most users of client devices to access these networks do not give such intermittent (or nearly continuous) access any conscious thought.

However, the current news is full of stories of network users having their personal and business information (e.g., e-mails, network shopping activities including financial information, and the like) stolen or otherwise undesirably accessed by third parties. In general, the wired or wireless accessing of a digital communications network such as the Internet provides a path for hackers and others to access a computer or other client device while it is linked to the network. Many individuals and businesses allow their client devices to be nearly continuously connected to the Internet, which leaves open this route for hackers and others to attempt to access the client devices and the information stored on these devices.

Internet security is a branch of computer security specifically related to the Internet and often involves browser security. An objective of Internet security is to establish rules and measures to use against attacks over the Internet that may affect user's client devices and their data. However, to date, Internet security efforts such as firewalls and the like have not proven wholly effective and the Internet remains an insecure channel for exchanging information that can lead to a high risk of intrusion such as hacking a client device or data theft for data stored on a client device. Likewise, wireless security is an attempt to prevent unauthorized access or damage to computers using a wireless network, but these security efforts have also not been totally effective. Wireless networking is prone to some security issues as hackers have found wireless networks relatively easy to break into and even use wireless technology to hack into wired networks and client devices presently connected to those wired networks.

Hence, there remains a need for improved systems and methods for guarding against unauthorized access to client devices communicatively linked or connected (in a wired or wireless manner) to the Internet or other digital communications networks.

SUMMARY

The inventor created a software tool (or software program) that can be provided on client devices used to access a digital communications network such as the Internet to enhance the security of the device. The software tool may be labeled a network traffic shut-off mechanism or a device's "NetWhacker." The network traffic shut-off mechanism functions to provide the cybercrimes and countermeasures concept of activating a single shut-off process for a client device for all Internet traffic (or other network traffic).

The theory behind such a single shut-off process or kill switch is the creation of a single point of control for one authority or another (e.g., manual selection of the tool on a client device or automated activation (based on time or another triggering event) of the tool by a security control module running on the client device) to shut down the Internet to protect the client device running the network traffic shut-off mechanism or NetWhacker to protect itself from unspecified assailants (e.g., hackers or the like using network connections to access a client device).

The network traffic shut-off mechanism (or NetWhacker software) allows, in some implementations, the client device operator to manually select or schedule the times when it will operate to disengage the client device from the Internet. After Internet or network disengagement, the client device is otherwise fully operable such that the operator has full use of the computer or client device and can continue to work or use their device and its software with no fear of data loss over a hacked or compromised Internet connection.

A computer system is typically no more secure than the persons responsible for its operation, but the network traffic shut-off mechanism provides one more level of security for those persons or users. Computer security is critical in almost any technology-driven industry that operates on computers and computer systems. The issues associated with use of computer-based systems and addressing their countless vulnerabilities are an integral part of maintaining an operational industry. Hence, the importance of computer security tools such as the network traffic shut-down mechanism described herein cannot be overstated.

More particularly, a client device is described that is specially configured to provide enhanced network traffic security to be and act like a special purpose computing device). The client device includes a processor and a network connection element (using wired or wireless technologies) to selectively operate to provide two-way data traffic between the client device and a digital communications network (e.g., the Internet, a local area network (LAN), a wide area network (WAN), or other network). The client device also includes a memory device managed by and accessible to the processor, and the memory device stores a network traffic schedule.

The client device includes a shut-down mechanism in the form (or having the structure of) software code in the memory device that, when executed by the processor, causes the network connection element (directly or via operation of the processor) to provide the two-way data traffic according to the network traffic schedule. Then, during operations, the network traffic schedule defines a first time period and a second time period, and the shut-down mechanism allows the network connection element to connect to the digital communications network during the first time period and prevents the network connection element to connect to the digital communications network during the second time period.

In some implementations, the network traffic schedule defines a first time period and a second time period, and the shut-down mechanism operates the network connection element to connect to the digital communications network during the first time period and operates the network connection element to remain unconnected to the digital communications network during the second time period. In such cases, the first time period comprises a connection start time and a connection end time, and the shut-down mechanism operates the network connection element to terminate a connection to the digital communications network upon detection of the connection end time. Then, with the connection terminated by the network connection element, access to the client device from the digital communications network is blocked.

In some implementations, the shut-down mechanism generates the network traffic schedule based on user input received by the client device. For example, the shut-down mechanism may generate a user interface (e.g., a graphical user interface (GUI)) and display it on an output screen of the client device. The user interface may be adapted for receiving the user input, and the user input typically includes the connection start time and the connection end time. The user interface may include a countdown clock displaying, during the first time period, a length of time until the connection end time (and during the second time period, a length of time until the connection start time).

According to other aspects of the description, a method is taught for providing network security for a client device. The method includes retrieving a network access schedule associated with the client device that defines a first time period and a second time period, and the method continues with determining a current time for the client device. When the current time is within the first time period based on the determining, the method includes turning off a network connection between the client device and a network. When the current time is within the second time period based on the determining, the method includes turning on a network connection between the client device and the network.

In some method implementations, the turning off and on steps are performed automatically without receiving additional user input via the client device. The method also may include, when the current time is within the first time period, displaying (e.g., in a user interface on the client device) a length of time until the second time period and an indication that the network connection is turned off. The method may also include, when the current time is within the second time period displaying (e.g., in a user interface on the client device) a length of time until the first time period ends and an indication that the network connection is turned on. The method may also include generating the network access schedule based on a first set of user input and modifying the network access schedule based on a second set of user input entered via a user interface displayed on a screen of the client device. In many implementations, the network is the Internet and the network connection comprises a two-direction wired or wireless connection between the client device and the Internet.

DETAILED DESCRIPTION

Briefly, the present description is directed toward methods and systems for enhancing security for client devices and data stored or accessible via these client devices when the client devices are used to access a digital communications network such as the Internet. To provide this added network security (or Internet security improvement), a network traffic shut-down mechanism in the form of a software application (or set of executable code or instructions) is loaded onto a client device such as a desktop, laptop, notebook, tablet or other computing device, a smartphone, an audiobook-type device, and the like. The network traffic shut-down mechanism acts to provide a single point of control for terminating a network connection or halting Internet traffic both from the client device to the Internet and also from the Internet to the client device.

One significant difference between the shut-down mechanism or NetWhacker tool/app and other Internet security software products is that these products do not shut down the Internet to the computer/client device. These other software products merely limit the user's access to the Internet, but this outward-going access control retains Internet connectivity that allows Internet hackers into the computer/client device and, potentially, into all of the data files on the computer/client device (or accessible via the computer/client device). In contrast, the shut-down mechanism or NetWhacker taught herein completely shuts down the network connection (e.g., network traffic in both directions), which shuts down a hacker's ability to access the computer/client device running the shut-down mechanism or NetWhacker through a network (e.g., Internet) connection whether the connection is wireless or wired (e.g., a LAN cable or other wired connection).

Figure 1:
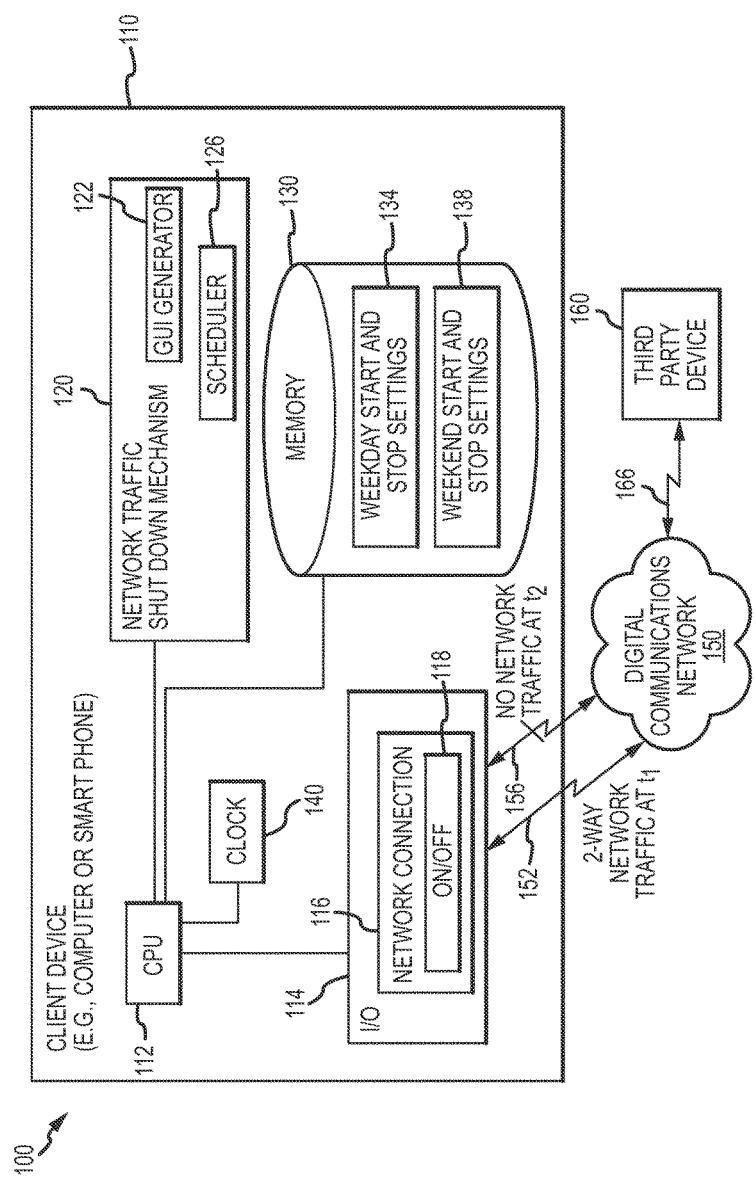
FIG. 1 illustrates a functional block or schematic view of a computer system with a client device selectively connecting with a digital communications network and with the client device including a NetWhacker or shut-off mechanism of the present description.

FIG. 1 illustrates a functional block or schematic view of a computer system 100 with a client device 110 selectively connecting with a digital communications network (such as the Internet, a LAN, or the like) 150 and with the client device 110 including a NetWhacker software program/application (or "app") or shut-off mechanism 120 of the present description. The client device 110 may take the form of any electronic device configured to run or execute software or code to provide the functionality of the network traffic shut-down mechanism 120 and to communicate in a wired or wireless manner over the network 150. For example, the client device 110 may take the form of a desktop or portable computer that an operator or user may use solely for work, solely for private use, or for both work and outside the office setting (as is common for many laptop, notebook, and tablet computing devices) while in other cases the client device 110 may be a smart or cell phone, a device adapted for audiobooks, video streaming, and browsing the Internet, or any other computing device.

As shown, the client device 110 includes a processor(s) 112 that manages operations of input/output devices 114 such as a keyboard, a touchscreen, a mouse, voice recognition software, and the like. Further, the I/O devices 114 includes a network connection 116, which may take the form of hardware (e.g., a LAN cable connector, a WiFi transceiver, and the like) and/or software (e.g., software that may be separate or part of the operating system (OS) that can be triggered to establish and break/terminate a connection with the network 150).

To this end, the network connection 116 is shown to be switchable between a first operating state ("ON") and a second operating state ("OFF") at 118. For example, the network connection 116 in the first switched state 118 (or "ON") at a first time may allow two way data traffic or network communications between the network 150 and the client device 110 as shown at 152 while in the second switched state 118 (or "OFF") at a second time may allow no network traffic as shown at 156 (i.e., no traffic either from the client device 110 to the network 150 or from the network 150 to the client device 110). Hence, in this second operating or OFF state 118 as shown at 156, a third party device 160 that may be operated by a hacker or other user cannot gain unauthorized access to the client device 110 (and its data) as may be the case as shown at 166 and 152 during the first operating or ON state 118 of the network connection 116.

The processor 112 also executes software (e.g., code downloaded to memory 130 of the device 110) to provide the network traffic shut-down mechanism 120. The shut-down mechanism 120 includes a graphical user interface (GUI) generator 122 to provide user interfaces, as discussed with reference to FIGS. 3-5, to allow an operator or user of the client device 110 to view and enter/modify network access schedules that are monitored and enforced by the shut-down mechanism 120 to selectively provide the two-way network traffic 152 at certain times and to terminated the network connection at other times to provide no traffic as shown at 156 between the client device 110 and the network 150.

To this end, the shut-down mechanism 120 may also include a scheduler 126 that acts to process inputs from the user in GUIs generated (such as by operation of a monitor/screen of the I/O devices 114 by the GUI generator 122) to create network access schedules. Examples of such schedules or network settings are shown to be stored in memory 130 by the shut-down mechanism 120. These may be default settings or settings supplied by a user/operator of the client device 110. As shown, the scheduler 126 may store a set of start and stop settings for network access (when the connection 116 should be or is ON as shown at 152 and, by inference, when the connection 116 should be or is OFF as shown at 156), and these may be set differently for each day of the week (or for any subset thereof) or for weekdays and weekends as shown at 134 and 138 (which is particularly suited for Internet security in the business setting of a typical 5-day work week).

The client device 110 further includes a clock 140 that determines a present time and, optionally, day of the week (as the schedule may be identical for all days in some cases). The network traffic shut-down mechanism 120 functions to use the time and day from the clock 140 along with the schedule settings 134, 138 (network access schedules) to determine the control over the network connection 116. Without the shut-down mechanism 120, the network connection 116 typically would only be manually switched between the connectivity states 118 by the user (e.g., place the WiFi setting of the device 110 as "ON" for many smartphone and portable client device users). Briefly, at times falling within access start and stop times 134, 138, the shut-down mechanism 120 will function (e.g., via the processor 112) to allow a connection with two-way network traffic to be established and maintained as shown at 152 between the client device 110 and the network 150. At times falling outside such start and stop times 134, 138, the shut-down mechanism 120 will function to terminate and not allow a new connection as shown at 156 between the client device 110 and the network 150 (e.g., not even traffic from the network 150 to the device 110 as was allowed with prior Internet access control software products).

Figure 2:
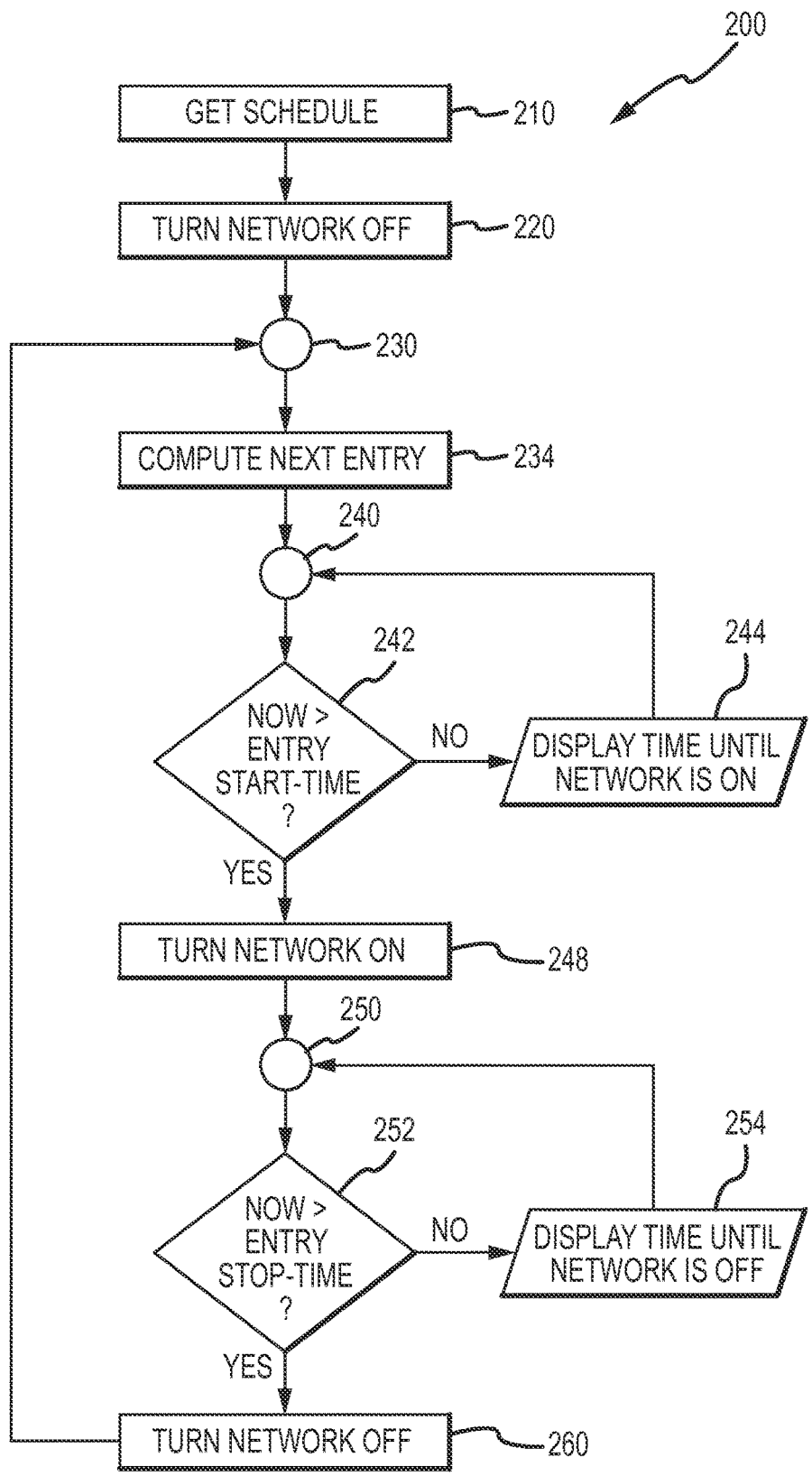
FIG. 2 is a flow diagram or algorithm of operations of a shut-off mechanism such as the shut-off mechanism of the client device of FIG. 1.

FIG. 2 is a flow diagram or algorithm 200 of operations of or method performed by a shut-off mechanism such as the shut-off mechanism 120 of the client device 110 of FIG. 1. The method 200 starts at 210 with the shut-off mechanism retrieving the network access schedule, which may be stored in local (or remote) memory such as in an extensible markup language (XML) data file or the like. Then, the method 200 continues at 220 with the shut-off mechanism causing the network connection to be turned off or ended (if needed or not already OFF). The main loop 230 of the network traffic control method 200 is then initiated. At step 234, the method 200 involves computing a next entry, and this step 234 involves the shut-off mechanism determining or deciding which schedule entry should be executed next.

At 240, the method 200 begins the network OFF (or network-to-client device connection broken or prevented) loop. At 242, the shut-down mechanism acts to determine whether the present time (for the present day) is greater (or later) than the schedule entry time. In other words, the shut-off mechanism acts to answer the question of whether the current time is later than the entry's start time. If not, a time until the network is to be turned on according to the schedule retrieved at step 210 is determined and, optionally, displayed in a shut-down mechanism GUI (see screen shot 310 of FIG. 3) that may be open or minimized on a screen of the client device. The method 200 then involves repeating the loop 240, step 242, and step 244 until the determination at 242 is positive (i.e., the present time is later than the network access start time in the present entry of the network access schedule). Upon this determination, the method 200 continues at 248 with the shut-off mechanism acting to turn the network ON or initiate or allow data traffic to flow (in both directions) between the client device and Internet or other network.

Then, at 250, the method continues with the network connection ON loop. At step 252, the shut-down mechanism acts to determine whether the present time (as provided by a device clock) is greater or later than the present network access schedule entry's stop time. In other words, the shut-down mechanism compares the present time to determine whether the current time is later than the entry's stop time. If not, the method 200 continues with determining and, optionally, displaying the time until the network is turned OFF (time when the network-to-client device connection or communication link is terminated or broken). The method 200 then continues with repeating steps 250, 252, and 254 until the determination at step 252 is positive (i.e., the time is later than the entry's stop time). Then, the method 200 continues with the shut-down mechanism turning the network OFF or terminating the network connection (or ending the link between the client device and the Internet or other network). The method 200 may then continue at 230 and step 234 with obtaining a next schedule entry (e.g., determining when the network connection will again be turned or allowed to be turned ON).

Figure 3:
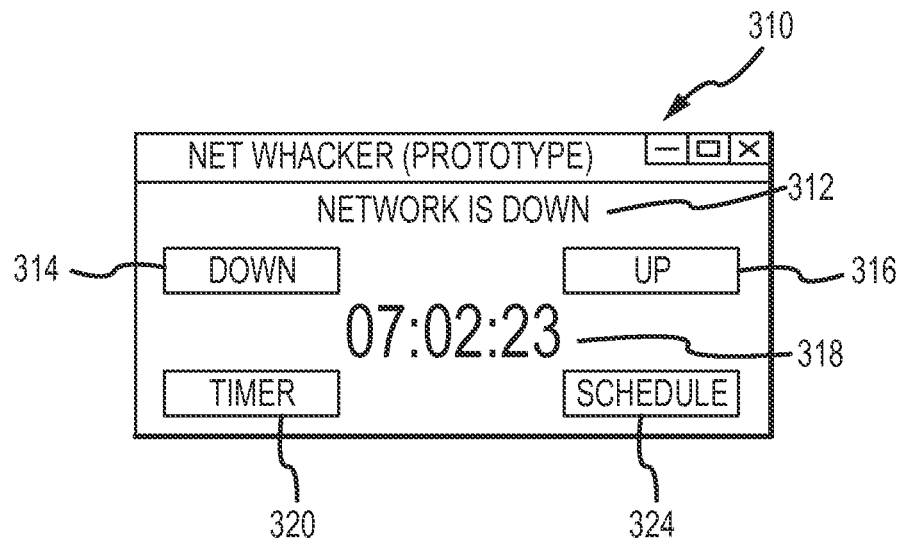
FIG. 3 illustrates a screen shot of a user interface displayed on a monitor or screen of a client device running a network traffic shut-down mechanism when network traffic is halted (or the network connection is terminated or "off")

FIG. 3 illustrates a screen shot of a user interface 310 displayed on a monitor or screen of a client device running a network traffic shut-down mechanism when network traffic is halted (or the network connection is terminated or "OFF"). In the user interface 310, the shut-off mechanism is operating in the "Down" or "OFF" mode as can be seen by text display area 312 of the user interface 310. In this OFF mode, the shut-down mechanism functions to cause the client device to operate so that there is no network activity (no communications in either the outgoing or incoming direction), and the computer/client device cannot be accessed or attacked by an outside force (e.g., another computer linked to a communications network such as the Internet).

While it may not be clear in the figure, the user interface 310 includes a DOWN button 314 that has been selected by a user (e.g., by pressing a touchscreen or moving a cursor with a mouse and clicking the button 314), and selection of the DOWN button 314 causes the shut-down mechanism accessed via user interface 310 to terminate a network connection (or to verify such a connection is broken and remains so). An UP button 316 is also provided in the user interface 310, which can be selected to cause the shut-down mechanism or NetWhacker app to bring the network back up for the client device upon which it is running (e.g., to initiate and retain a link with a digital communications network such as the Internet).

Another display area 318 is used to show a clock that provides a countdown (e.g., is an active display area) until the network comes back "up" or the length of time until a network connection is allowed and will be automatically enacted by the shut-down mechanism. The user interface 310 also includes a time button 320 that can be selected to start or stop the countdown (e.g., hides the information shown in display area 318). The user interface 310 also includes a schedule button 324 that can be selected to cause the user interface generator to display a schedule screen (e.g., shown in the interface 510 of FIG. 5) to allow the user to view and, optionally, change or set the network connectivity schedule for this client device.

Figure 4:
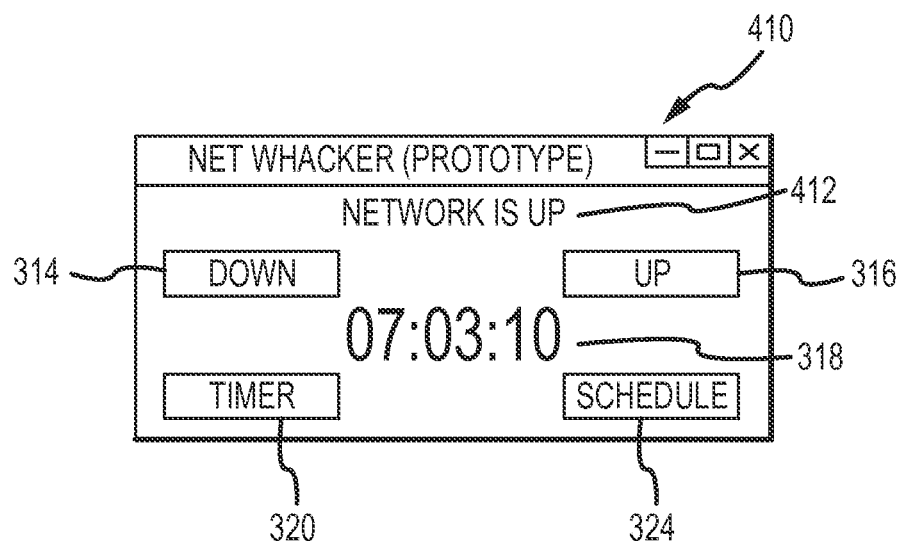
FIG. 4 illustrates a screen shot of the user interface of FIG. 3 in a second or different operating state than in FIG. 3 such as when network traffic is occurring in both directions (to and from the client device) or the network connection is active or "on"

FIG. 4 illustrates a screen shot of the user interface 410 of FIG. 3 in a second or different operating state than in FIG. 3 such as when network traffic is occurring in both directions (to and from the client device) or the network connection is active or "ON," which is indicated by the text display area 412. The user interface 410 indicates that the shut-down mechanism or NetWhacker app is in an "up" or "ON" mode. In this mode, the DOWN button 314 is not active/selected but, instead, the user has selected the UP button 316 (which may not be readily apparent with the figure but should be understood by those skilled in the GUI arts). When the shut-down mechanism or NetWhacker app is in the "ON" mode, it acts to ensure that network activity is allowed and is not hindered (e.g., initiates or retains and/or does not halt the network connection of the client device to a particular network such as the Internet). The client device/computer may be accessed from outside sources (other computers/client devices) via the network link. The clock display 318 now is used by the shut-down mechanism to show a countdown (or length of time) until the network goes "down" or "OFF" (e.g., answers the question of how long will the client device remain connected to the network).

Figure 5:
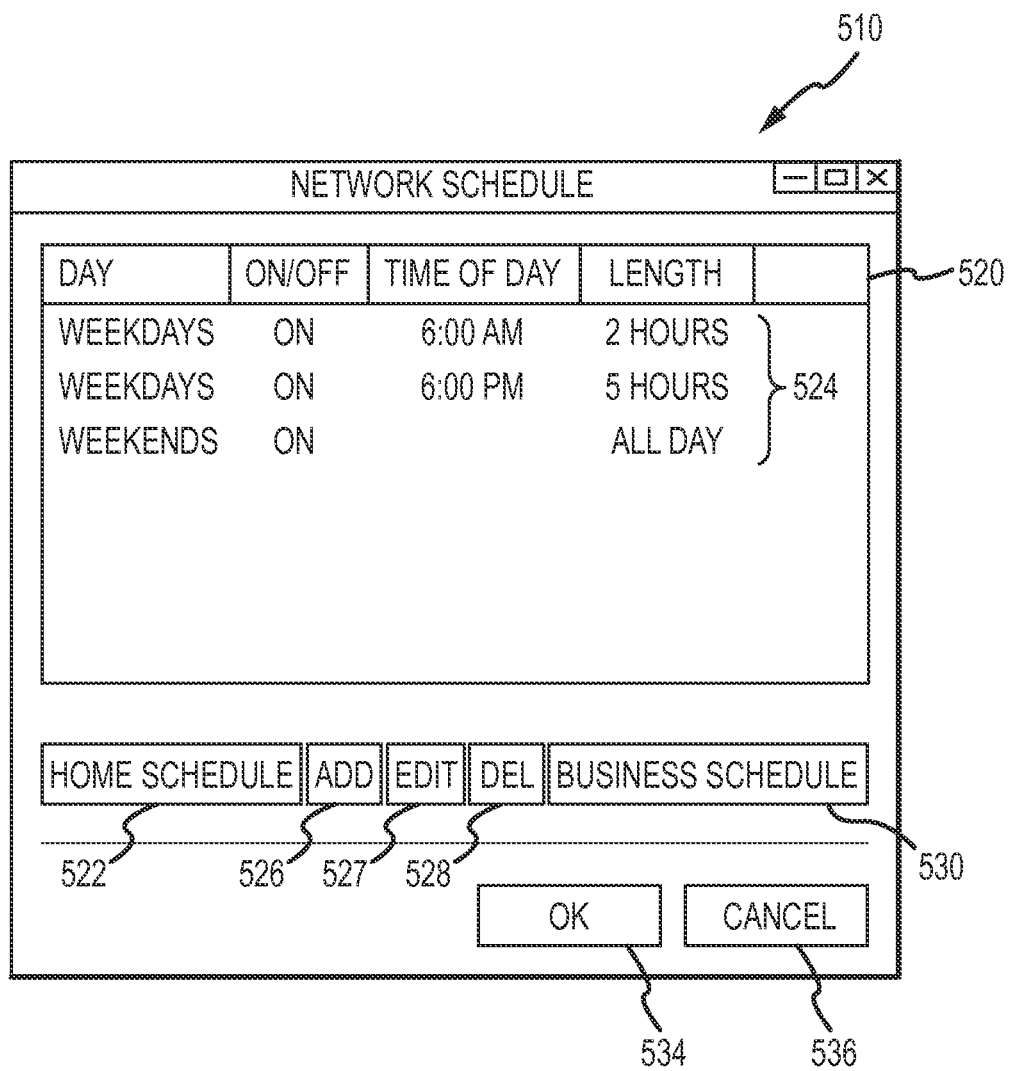
FIG. 5 illustrates a screen shot of another user interface to or provided by the network traffic shut-down mechanism allowing an operator of the client device to view and set and/or modify a network connection schedule monitored and controlled (as shown in FIG. 2, for example) by the network traffic shut-down mechanism.

FIG. 5 illustrates a screen shot of another user interface 510 to or provided by the network traffic shut-down mechanism allowing an operator of the client device to view and set and/or modify a network connection schedule monitored and controlled (as shown in FIG. 2, for example) by the network traffic shut-down mechanism. A display window or area 520 is used to display a schedule generated by the shut-down mechanism using default settings (e.g., connectivity provided from 8 AM to 5 PM local time on each weekday and the like) and/or using input from the operator via the user interface 510. User may create additional schedule entries that make sense to them or work better for their use of the client device to provide desired Internet security, and input can be provided by operating various interface buttons such as an Add button, 526, an Edit button 527, a Delete button 528, an OK (or accept or save) button 534, and a Cancel button 536.

The user interface 510 may be adapted to provide access to one, two, or more network access schedules implemented by a shut-down mechanism. As shown in FIG. 5, the shut-down mechanism is configured to use two different schedules that may be accessed in the display window 520 by selecting either the Home Schedule button 522 or the Business Schedule button 530. In the present example, it may be assumed that the Home Schedule button 522 is selected to provide/display the home schedule at 524. A Business Schedule may differ such as creating entries that are ON from 6 AM to 6 PM (or other work period for an operator of the client device) every weekday (or other days worked by the operator of the client device). Through use of the interface 510, an operator can access the two (or more) connection schedules to modify these schedules and their entries to suit their needs (or the needs/rules of the company/entity that has provided the client device upon which the NetWhacker app runs).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

Embodiments of the subject matter described in this specification can be implemented as one or more computer program products, i.e., one or more modules of computer program instructions encoded on a computer-readable medium for execution by, or to control the operation of, data processing apparatus. For example, the modules/software used to provide the network traffic shut-down mechanism and its engines, programs, modules, and the like (and similar modules/software) may be provided in such computer-readable medium and executed by processor(s) on one or more client or user devices (e.g., computing devices operated by users/operators to periodically communicate with or over a communications network such as the Internet). The computer-readable medium can be a machine-readable storage device, a machine-readable storage substrate, a memory device, a composition of matter affecting a machine-readable propagated signal, or a combination of one or more of these types of media.

The terms "client device" and "network traffic shut-down mechanism" encompass all apparatus, devices, and machines for processing data including, e.g., a programmable processor, a computer, or multiple processors or computers. The system (such as devices and servers in system 100 of FIG. 1) can include, in addition to hardware, code that creates an execution environment for the computer program, e.g., code that constitutes processor firmware, a protocol stack, a database management system, an operating system, or a combination of one or more of these items. A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry. Processors suitable for the execution of a computer program include, e.g., both general and special purpose microprocessors, and any one or more processors of any kind of digital computer. Generally, a processor receives instructions and data from a read-only memory or a random access memory or both. Generally, the elements of a computer are a processor for performing instructions and one or more memory devices for storing instructions and data. The techniques described herein may be implemented by a computer system configured to provide the functionality described.

For example, FIG. 1 is a block diagram illustrating one embodiment of a computer system configured to implement the methods described herein such as with reference to the other included figures. In different embodiments, the computer system 100 with its client device may be any of various types of devices including, but not limited to, a personal computer system, desktop computer, laptop computer, notebook computer, netbook computer, mainframe computer system, handheld computer, workstation, network computer, application server, storage device, a consumer electronics device (e.g., camera, camcorder, set top box, mobile device, video game console, handheld video game device, etc.), a peripheral device (e.g., switch, modem, router, etc.), or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, etc. Computer-readable media suitable for storing computer program instructions and data include all forms of non-volatile memory, media and memory devices, including, e.g., semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user (with an I/O portion of a client device or server device), embodiments of the subject matter described in this specification can be implemented on a computer having a display device, e.g., LCD (liquid crystal display) or LED (light emitting diode) monitor, for the computer to display information to the user; and a keyboard and a pointing device, e.g., a mouse or a trackball, for the user to provide input to the computer. Other types of devices can be used to provide for interaction with a user as well, e.g., feedback provided to the user can be any form of sensory feedback, e.g., visual feedback, auditory feedback, or tactile feedback; and input from the user can be received in any form, including acoustic, speech, or tactile input such as may be useful for providing telephony communications with telephony I/O or similar forms.

Similarly, while operations are depicted in the drawings in a particular order, this depiction should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

I claim:

1. A client device with enhanced network traffic security, comprising:
    a processor;
    a network connection element selectively operating to selectively provide two-way data traffic between the client device and a digital communications network;
    a memory device managed by and accessible to the processor, wherein the memory device stores a network traffic schedule,
    wherein the network traffic schedule defines a first time period and a second time period; and
    a shut-down mechanism comprising software code in the memory device that, when executed by the processor, causes the network connection element to:
    provide the two-way data traffic according to the network traffic schedule,
    connect to the digital communications network during the first time period and operates the network connection element to remain unconnected to the digital communications network during the second time period, wherein the first time period comprises a connection start time and a connection end time;

in response to the determination that the current time is the end time of the first time period, terminate a connection to the digital communications network block access of the network connection to the client device from the digital communications network so that the two-way data traffic is prevented including halting all access to the client device from the digital communications network; and restart the connection to the digital communications network by applying a preset policy associated with a user's access permission during the first time period or after an end of the second time period.

2. The client device of claim 1, wherein the network traffic schedule defines a first time period and a second time period and wherein the shut-down mechanism allows the network connection element to connect to the digital communications network during the first time period and prevents the network connection element to connect to the digital communications network during the second time period.

3. The client device of claim 1, wherein the shut-down mechanism generates the network traffic schedule based on user input received by the client device.

4. The client device of claim 3, wherein the shut-down mechanism generates a user interface displayed on an output screen of the client device and adapted for receiving the user input and wherein the user input includes the connection start time and the connection end time.

5. The client device of claim 3, wherein the user interface includes a countdown clock displaying, during the first time period, a length of time until the connection end time.

6. The client device of claim 1, wherein the network connection element comprises a hardware mechanism.

7. The client device of claim 6, wherein the hardware mechanism is an local area network (LAN) cable connector or a wireless transceiver.

8. The client device of claim 1, wherein the network connection element comprises software that is part of an operating system of the client device.

9. A method for providing network security for a client device, comprising:

retrieving a network access schedule associated with the client device that defines a first time period and a second time period;

connecting, by a network connection element, the client device to the digital communications network during the first time period and operates the network connection element to remain unconnected to the digital communications network during the second time period, wherein the first time period comprises a connection start time and a connection end time;

determining a current time for the client device;

in response to the determination that the current time is the end time of the first time period, operating the network connection element to turn off a network connection between the client device and the digital communications network;

blocking all access to the client device from the digital communications network from another client device so that the two-way data traffic is prevented including halting all access to the client device from the digital communications network; and in response to the determination that the current time is within the second time period, restart the connection to the digital communications network by applying a preset policy associated with a user's access permission during the first time period or after an end of the second time period.

10. The method of claim 9, wherein the turning off and on steps are performed automatically without receiving additional user input using the client device.

11. The method of claim 9, further comprising when the current time is within the first time period displaying, in a user interface on the client device, a length of time until the second time period and an indication that the network connection is turned off.

12. The method of claim 9, further comprising when the current time is within the second time period displaying, in a user interface on the client device, a length of time until the second time period ends and an indication that the network connection is turned on.

13. The method of claim 9, further comprising generating the network access schedule based on a first set of user input and modifying the network access schedule based on a second set of user input entered using a user interface displayed on a screen of the client device.

14. The method of claim 9, wherein
the digital communications network is the Internet and the network connection comprises a two-direction wired or wireless connection between the client device and the Internet.

* * * * *